United States Patent [19]

Brenez

[11] Patent Number: 4,821,764
[45] Date of Patent: Apr. 18, 1989

[54] DISPENSING COCK FOR LIQUID, NOTABLY FOR BEER

[75] Inventor: Simon Brenez, Tienen, Belgium

[73] Assignee: Ateliers de Construction E. Molinet, Tienin, Belgium

[21] Appl. No.: 117,628

[22] Filed: Nov. 5, 1987

Related U.S. Application Data

[63] Continuation of Ser. No. 782,583, Oct. 1, 1985, abandoned.

[30] Foreign Application Priority Data

Oct. 10, 1984 [BE] Belgium .............................. 0/213808

[51] Int. Cl.⁴ ...................... F16K 11/08; F16K 23/00
[52] U.S. Cl. .................................... 137/238; 137/240; 137/589; 137/625.41; 137/801; 239/112; 239/116
[58] Field of Search ........... 137/238, 240, 605, 625.41, 137/801, 375, 589; 222/144.5, 148, 479, 482, 571; 239/112, 114, 115, 116, 117, 118, 123, 581.1

[56] References Cited

U.S. PATENT DOCUMENTS

| | | | |
|---|---|---|---|
| 165,944 | 7/1875 | Newman et al. ..................... | 137/375 |
| 667,301 | 2/1901 | Dredge ............................ | 137/605 X |
| 2,367,809 | 1/1945 | Stein et al. ........................ | 137/801 |
| 2,906,464 | 9/1959 | Tomlinson .................... | 239/581.1 X |
| 3,115,149 | 12/1963 | Tonna et al. ...................... | 137/240 |
| 3,115,150 | 12/1963 | Sariotti et al. ..................... | 137/240 |
| 3,176,713 | 4/1965 | McDermott et al. .......... | 251/368 X |
| 3,302,660 | 2/1967 | Haag .............................. | 137/240 |
| 3,342,205 | 9/1967 | Quinto ............................ | 137/375 |
| 3,426,797 | 2/1969 | Baker ............................ | 137/625.31 |
| 3,476,138 | 11/1969 | Doremus et al. .............. | 251/352 X |
| 3,520,325 | 7/1970 | Stuart ............................ | 137/375 |
| 3,542,336 | 11/1970 | Giese ............................ | 251/309 X |
| 3,831,621 | 8/1974 | Anthony et al. .............. | 137/625.31 |
| 4,327,758 | 5/1982 | Ulmann ....................... | 251/208 X |
| 4,331,176 | 5/1982 | Parkison ..................... | 137/454.6 X |
| 4,372,337 | 2/1983 | Holzenberger ................ | 137/874 X |
| 4,603,655 | 8/1986 | Switall .......................... | 239/112 X |

FOREIGN PATENT DOCUMENTS

| | | | |
|---|---|---|---|
| 491553 | 2/1930 | Fed. Rep. of Germany ...... | 137/589 |
| 1053955 | 3/1959 | Fed. Rep. of Germany . | |
| 616349 | 1/1927 | France ........................... | 137/589 |
| 3546 | 4/1891 | Switzerland ................ | 137/589 |
| 7337 | 9/1893 | Switzerland ................ | 137/589 |
| 114676 | 4/1926 | Switzerland ................ | 137/589 |
| 429941 | 6/1935 | United Kingdom ........... | 137/589 |
| 2106615 | 4/1983 | United Kingdom . | |

Primary Examiner—Gerald A. Michalsky
Attorney, Agent, or Firm—Kenyon & Kenyon

[57] ABSTRACT

The beer tap is made with stainless steel lines having constant cross-section and smooth bends and which are embedded in plastic. In an open position, the discharge line communicates with the feed line via two plates. In the closed position, the discharge line is rotated into communication with a cleaning line in the tap body.

21 Claims, 2 Drawing Sheets

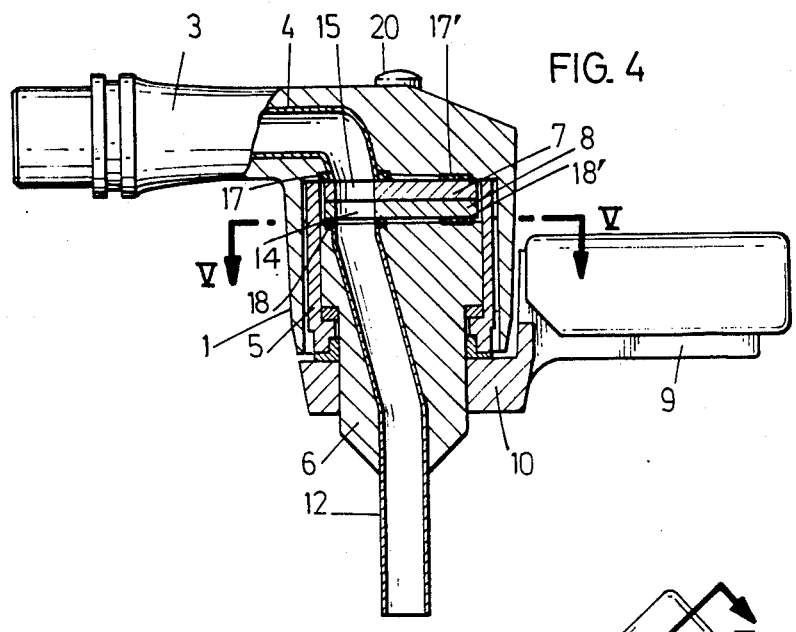
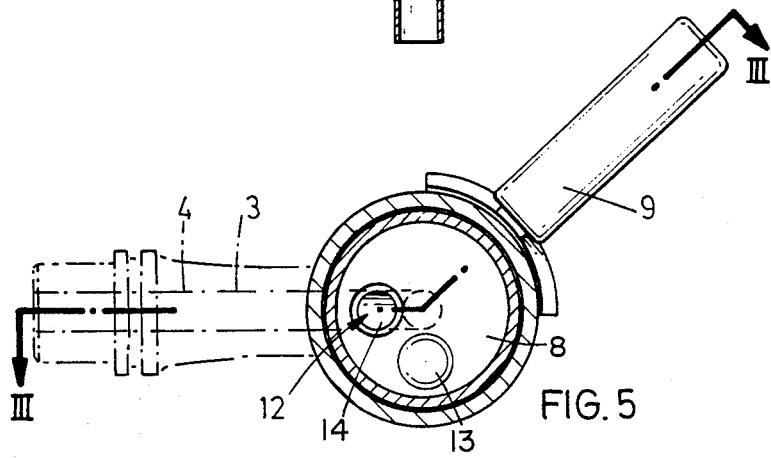
FIG. 4
FIG. 5

DISPENSING COCK FOR LIQUID, NOTABLY FOR BEER

This is a continuaton of application Ser. No. 782,583 filed Oct. 1, 1985, now abandoned.

This invention relates to a dispensing cock or tap, notably for beer.

Heretofore, various types of faucets or taps have been known for the dispensing of beer from kegs or from tap lines. Generally, these faucets or taps require cleaning from time-to-time to avoid the accumulation of bacteria or other organisms at various sites with the faucets or taps particularly where the dispensing lines of the faucets or taps are exposed to air. In some cases, this has required the removal of a tap from a keg or beer dispensing line in order to be able to properly clean the tap.

In some cases, faucets have been formed of one piece brass elements with a beer dispensing line passing through the element. However, this has usually required the drilling of bores from opposite ends of the faucet element to form the dispensing line in order to obtain an appropriate bend in the line for dispensing from a feed line which is usually at a right angle to the faucet outlet. In such cases, corners are formed where the bores meet so that the beer which is subsequently dispensed through the lines have been caused to foam.

Accordingly, it is an object of the invention to provide a cock or tap with very high strength and long life and which requires no maintenance.

It is another object of the invention to provide a tap with feed and dispensing lines which do not have any disadvantageous bends, angles or sudden changes or direction.

It is another object of the invention to provide a dispensing tap which has feed and dispensing lines of constant cross section.

It is another object of the invention to permit the chemical or mechanical cleaning of the feed and dispensing line of a tap in a relatively efficient manner.

It is another object of the invention to provide a dispensing tap which can be readily cleaned in a closed position.

It is another object of the invention to permit the mechanical or chemical cleaning of a dispensing line in a counter flow relation.

Briefly, the invention provides a cock or tap comprising a body having a sleeve-like part, a cover, a feed line extending through the cover and a cleaning opening extending through the cover. In addition, the tap has a rotatable part rotatably mounted within the sleeve-like part of the body to move between a closed position and an open position. In addition, the rotatable part has a dispensing line extending therethrough with a lower portion on an axis of rotation of the rotatable part and a curved upper portion for aligning with the feed line in the open position and with the cleaning opening in the closed position.

The tap may also have a handle secured to the rotatable part for rotating this part relative to the body.

In addition, a pair of relatively rotatable plates are disposed between the cover and the rotatable part of the tap is seal tight relation. One of these plates is fixed to the body and has a pair of openings which are aligned with the feed line and the cleaning opening, respectively. The other plate is fixed to the rotatable part and has a pair of openings aligned with the openings in the plate in the rotatable part when in the closed position. In the closed position, one of the openings in the second plate is aligned with the cleaning opening.

A remarkable feature of the invention lies in the dispensing line having the end thereof free and that portion lying upstream thereof lying along the geometrical axis of the rotating part, while the opposite end of the same line opens eccentrically relative to the rotating part, so as to come to lie either along the feed line axis, or along the axis of the opening.

To fulfill an essential object of the invention, the lines are comprised of a stainless steel tube, and have over the whole length thereof a substantially constant cross-section having but smooth bends, and are embedded in a moldabe or injectable material.

Other details and advantages of the invention will stand out from the following description, given by way of non limitative example and with reference to the accompanying drawings, in which:

FIG. 4 is a lengthwise section view of the cork in an open position allowing the flow.

FIG. 5 is a section view along line V—V in FIG. 4.

Figure 1:
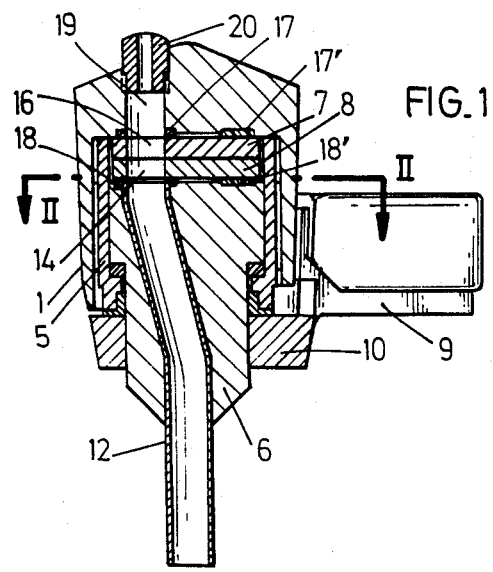
FIG. 1 is a lengthwise section view of the cock in closed position.

The cock or tap as shown in these figures comprises a cock body 1 which is of generally cylinder shape, and ends at the top with a cover 2 wherewith a sleeve-like body 3 connects. These three parts form an unit which will be called hereinafter the cock body.

The cylinder-shaped portion of the cock body 1 encloses a cylinder 5, which retains a rotatable part 6 as well as two plates 7 and 8.

The rotatable part 6 is integral with a crown 10 whereon a handle 9 is secured, and encloses a dispensing line 12.

It is to be noted that the plate 8 is fixed with the rotating part 6, while the plate 7 is fast to the lower surface of the cock body 1.

Each plate 7 and 8 is provided with two openings shown respectively in 13 and 14, provided in plate 8, and in 15 and 16, provided in plate 7.

Even if for structural reasons, the plates 7 and 8 are preferably discs, the same purpose might be fulfilled by plates with different shapes, for example in half-moon shape.

Before describing the operation of the cock or tap according to the invention and the remarkable advantages which characterize same, it will further be noted that the feed line 4 has that end thereof facing plate 7 fitted with a ring-like gasket 17, while conversely, that end of dispensing line 12 facing plate 8 is also fitted with a ring-like gasket 18. Due to the eccentric arrangement of ring-like gasket 17 and feed line 4, as well as of ring-like gasket 18 and discharge line 12 relative to the cylinder-shaped portion or cock body 1, it is necessary to balance the plates 7 and 8 with two other gaskets 17′ and 18′ (FIGS. 1 and 4), and this relative to the rotating part 6 as well as relative to the inner surface of the cock body 1. These structural features are required to retain in the suitable position the plates 7 and 8 and prevent same lying askew inside the housing provided therefor.

Referring to FIGS. 1 and 4, the discharge line 12 has a lower portion which has a geometrical axis alinged accurately along the geometrical axis of the rotating part 6. In addition, the discharge line is curved in the upward direction towards the plates 8, 7 so as to lie accurately along the axis of the opening of the feed line 4 when in the open position shown in FIG. 4 or in alignment with the cleaning opening 19 when in the closed position as shown in FIG. 1. Further, the discharge line 12 is aligned with the opening 14 of the plate 8 at all times since the plate 8 rotates with the rotatable part 6.

Figure 2:
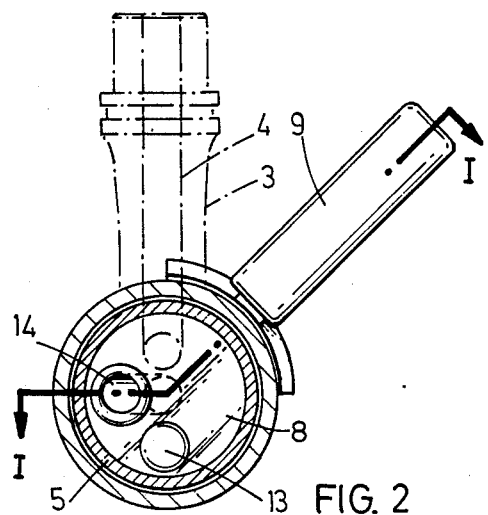
FIG. 2 is a section view along line II—II in FIG. 1.

Referring to FIG. 2, when in the closed position, the opening 14 of the plate 8 communicates with the cleaning opening 19 while the opening 13 is sealed over by the plate 7. When in the open position, as shown in FIG. 5, the opening 14 of the plate 8 is aligned with the feed line 4 while the opening 13 is aligned with the cleaning opening 19.

Referring to FIG. 1, the cleaning opening 19 with a gasket 17 passes through the body 1 and is fitted with a plug 20 which may be removed to allow cleaning of the discharge line 12. As indicated, the plug 20 has a bore in order to let the liquid be completely discharged.

As each plate 7, 8 has two openings, 15 and 16 respectively on the one hand, and 13 and 14 on the other hand, it is directly clear that due to rotating of handle 9 and taking into account the unmoving nature of plate 7 relative to cock body 1, while plate 8 rotates together with rotating body 6, it is possible to obtain the following positions:

(a) flow position (FIG. 4) which corresponds to the lining-up of the opening from feed line 4, opening 15 in plate 7, and opening 14 in plate 8;

(b) flow stoppage and complete discharge from dispensing line (FIG. 1) by having the opening 14 in plate 8 correspond to opening 16 in plate 7 and opening 19.

In the last position as defined under (b) and after moving away the pierced plug 20, an ideal position is provided to perform a complete and easy cleaning of all the components which are part of the cock and which for any reason whatsoever, have contacted air.

Figure 3:
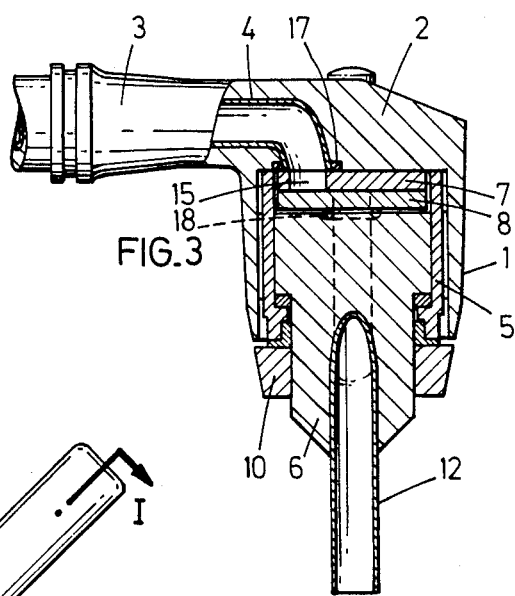
FIG. 3 is a lengthwise section of the cock in the closed position, but along a section plane differing by 90° from the section plane of FIG. 1.

In the cleaning position which corresponds to position (b), the flow is stopped as the opening from feed line 4 (FIG. 3) does not communicate with opening 14, nor with opening 13 in plate 8. There is thus complete independence of both feed and dispensing circuits and impossibility to pass from one circuit to the other one.

Both feed line 4 and dispensing line 12 are comprised of a material which does not react with oxygen, nor with the cleaning and rinsing chemicals. Use will preferably be made of stainless steel, but it is clear that other inert materials might be used.

The cock structure according to the invention is characterized by the fact that the feed line 4 and the dispensing line 12 are embedded in a moldable or injectable material. Thereby this structure does have many advantages which are not to be found in cock structures where the feed and/or discharge lines are obtained by boring in the material, channels which due to the design thereof, have angles or sharp edges. Such structures peculiar to the art as applied up to now regarding cockmaking, are the cause of foaming, mainly when it is a matter of dispensing beer and similar beverages. Moreover, cleaning such channels is made extremely difficult when use is made, as it occurs regularly, of small sponges which move in counter-flow through the channels with a rinsing liquid.

Quite to the contrary, the constant cross-section and the bends which may be provided by lines such as for example, stainless steel tubes, have none of the above-described drawbacks.

As for plates 7 and 8, they are generally provided in the shape of discs. To obtain faultless seal tightness, it is extremely advantageous to make these from a ceramic material. It is understood that use may be made for such parts, of any other synthetic or natural material allowing to obtain a roughnss, a parallelism and an evenness at least equal to the qualities obtained with ceramic.

The invention thus provides a tap which can be readily cleaned and particularly that portion of the tap which regularly contacts air, i.e. the line portion which lies downstream of the closing members.

During cleaning of dispensing line 12 and the corresponding opening in plate 8, the cock tightness is complete and the beer or liquid to be dispensed remains pressurized.

Besides these clean advantages, the cock design according to the invention has a very high simplicity, because enclosing a piping from stainless steel or similar into a injectable or moldable material is a technical solution which is both neat and simple to work out.

Moreover such a solution, on the one hand, eliminates any foaming when the liquid, in this case beer, flows through lines the bends of which are particularly smooth, and on the other hand allows cleaning of any line from one end to the other end, in flow or counter-flow direction.

Such a cock structure enhances the complete cleaning of the lines, thus allowing easy elimination of any bacteria cite. This is essentially due to the profile and constant cross-section of the cock lines.

It must be understood that the invention is in no way limited to the above embodiment and that many changes may be brought therein, without departing from the scope of the invention as defined in the appended claims.

I claim:

1. Liquid-dispensing cock or tap, which comprises a cock body of generally cylinder shape, wherein a feed line opens and which serves moreover as housing on the one hand for a rotating part wherein a dispensing line is located, and on the other hand for a pair of plates which are each pierced by two openings, which parts are arranged inside the cock body, between the feed line and the dispensing line, that plate nearest the feed line being fixed relative to the cock body and arranged with the one opening thereof in the extension of the feed line, while the other plate fixed relative to said rotating part, may be rotated by means of a handle about the geometrical axis of the cock body to have the dispensing line communicate alternately with the feed line and an opening running through the cock body along an axis wherewith the top portion of the dispensing line axis may coincide, to allow after moving away a plug, cleaning said dispensing line through said cock body.

2. Cock as defined in claim 1, in which said dispensing line has the end thereof free and that portion thereof lyng downstream thereof lying along the geometrical axis of said rotating part, while the opposite end of said same dispensing line opens eccentrically relative to said rotating part, so as to come to lie either along the axis of feed line, or along the axis of said opening, the lower portion of the dispensing line being located along the geometrical axis of said rotating part.

3. Cock as defined in either one of claims 1 and 2, in which said dispensing line and feed line are comprised of a material which does not react with the dispensed liquids, nor with the cleaning and rinsing products, each line being embedded in a mouldable or injectable material forming respectively the rotating part and said cock body, both said lines having over the whole length thereof, a substantially constant cross-section and having but smooth bends.

4. Cock as defined in claim 1 in which said plates each pierced with two openings are discs.

5. Cock as defined in claim 1 in which said plates are comprised of a ceramic material.

6. Cock as defined in claim 1 in which the tightness between on the one hand the cock body, comprising the feed line and the material it is embedded in, and the top plate, and on the other hand the lower plate and the movable part of the cock comprising the dispensing line and the material it is embedded in, is obtained by means of two ring-like gaskets concentric relative to the openings provided in said plates.

7. Cock as defined in claim 6, in which said gaskets are annulus-shaped gaskets.

8. Cock as defined in claim 1 in which the balancing of said plates relative to the lower portion of the cock body, the top portion of movable part, is insured on the one hand by the annulus-shaped gaskets, and on the other hand by at least one bearing point from a material having a resilient structure with the same nature as said ring-like gaskets.

9. Cock as defined in claim 1 in which said plug is pierced to allow discharging liquid from the dispensing line.

10. A beer tap comprising
a body having a sleeve-like part, a cover connected to and over one end of said part, a feed line extending through said cover and a cleaning opening extending through said cover; and
a rotatable part rotatably mounted within said sleeve-like part of said body to move between a closed position and an open position, said rotatable part having a dispensing line extending therethrough, said dispensing line having a lower portion on an axis of rotation of said rotatable part and a curved upper portion for coaxially aligning with said feed line in said open position and coaxially with said cleaning opening in said closed position.

11. A beer tap as set forth in claim 10 wherein said body is a plastic body and said feed line is a stainless steel line embedded in said body.

12. A beer tap as set forth in claim 11 wherein said rotatable part is made of plastic and said dispensing line is a staianless steel line embedded in said rotatable part.

13. A beer tap as set forth in claim 10 wherein said feed line is of constant cross-section and said dispensing line is of constant cross-section to facilitate cleaning thereof.

14. A beer tap comprising
a body having a sleeve-like part, a cover, a feed line extending through said cover and a cleaning opening extending through said cover;
a rotatable part rotatably mounted within said sleeve-like part of said body to move between a closed position and an open position, said rotatable part having a dispensing line extending therethrough, said dispensing line have a lower portion on an axis of rotation of said rotatable part and a curved upper portion for aligning with said feed line in said open position and said cleaning opening in said closed position; and
a pair of relatively rotatable plates between said cover and said rotatable part in seal tight relation, one of said plates being fixed to said body and having a pair of openings aligned with said feed line and said cleaning opening and the other of said plates being fixed to said rotatable part and having a pair of openings aligned with said openings in said one plate in said open position whereby in said closed postion one of said openings in said other plate is aligned with said cleaning opening.

15. A beer tap as set forth in claim 14 which further comprises a handle secured to said rotatable part for rotating said rotatable part relative to said body.

16. A beer tap as set forth in claim 14 which further comprises a cylinder within said sleeve-like part having said plates in said rotatable part retained therein.

17. A beer tap comprising
a body having a feed line and a cleaning opening therein;
a rotatable part concentrically mounted in said body for movement about a central axis of rotation relative to said body, said part having a dispensing line extending therethrough, said line having a curved portion at one end lying on an axis eccentric and parallel to said central axis and an outlet at an opposite end for dispensing beer, said curved portion being coaxially aligned with said feed line in a first relative position of said body and said part and being coaxially aligned with said cleaning opening in a second relative position of said body and said part; and
a handle secured to said rotatable part for effecting movement of said rotatable part between said relative positions whereby said dispensing line may selectively dispense beer from said feed line or be cleaned through said cleaning opening.

18. A beer tap as set forth in claim 17 wherein said body is a plastic body and said feed line is a stainless steel line embedded in said body.

19. A beer tap as set forth in claim 18 wherein said rotatable part is made of plastic and said dispensing line is a stainless steel line embedded in said rotatable part.

20. A beer tap as set forth in claim 17 wherein said feed line is of constant cross-section and said dispensing line is of constant cross-section.

21. A beer tap comprising
a body having a feed line and a cleaning opening therein;
a rotatable part concentrically mounted in said body for movement relative to said body, said part having a dispensing line extending therethrough aligned with said feed line in a first relative position of said body and said part and aligned with said cleaning opening in a second relative position of said body and said part;
a handle secured to said rotatable part for effecting movement of said rotatable part between said relative positions whereby said dispensing line may selectively dispense beer or be cleaned;
a pair of relatively rotatable plates between said cover and said rotatable part in seal tight relation, one of said plates being fixed to said body and having a pair of openings aligned with said feed line and said cleaning opening and the other of said plates being fixed to said rotatable part and having a pair of openings aligned with said openings in said one plate in said open position whereby in said closed position one of said openings in said other plate is aligned with said cleaning opening.

* * * * *

UNITED STATES PATENT AND TRADEMARK OFFICE
CERTIFICATE OF CORRECTION

PATENT NO.   :  4,821,764

DATED        :  April 18, 1989

INVENTOR(S)  :  Simon Brenez

It is certified that error appears in the above-identified patent and that said Letters Patent is hereby corrected as shown below:

Column 2, line 15 "moldabe" should be --moldable--
Column 2, line 67 "alinged" should be --aligned--
Column 4, line  8 "roughnss" should be --roughness--
Column 4, line 18 "clean" should be --clear--
Column 4, line 59 "lyng" should be --lying--.

Signed and Sealed this

Sixth Day of February, 1990

*Attest:*

JEFFREY M. SAMUELS

*Attesting Officer*    *Acting Commissioner of Patents and Trademarks*